United States Patent
Kelley et al.

(10) Patent No.: US 8,952,991 B1
(45) Date of Patent: *Feb. 10, 2015

(54) SELECTIVE ZOOM RESPONSE BEHAVIOR IN COMPUTING SYSTEMS

(75) Inventors: Yohko A. F. Kelley, Woodinville, WA (US); Benjamin P. Bauermeister, Seattle, WA (US); Michael S. De Laurentis, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 12/885,681

(22) Filed: Sep. 20, 2010

Related U.S. Application Data

(63) Continuation of application No. 11/204,760, filed on Aug. 16, 2005, now Pat. No. 7,916,157.

(51) Int. Cl.
  *G09G 5/00* (2006.01)
(52) U.S. Cl.
  USPC .......................... 345/660; 345/619; 345/661
(58) Field of Classification Search
  CPC ............... G09G 2340/045; G09G 2340/0407; G06T 3/40
  USPC .......................................... 345/619, 660, 661
  See application file for complete search history.

(56) References Cited

U.S. PATENT DOCUMENTS

| | | |
|---|---|---|
| 5,699,535 A | 12/1997 | Amro |
| 6,304,271 B1 | 10/2001 | Nehme |
| 7,197,718 B1 | 3/2007 | Westerman et al. |
| 7,197,719 B2 | 3/2007 | Doyle et al. |
| 7,213,214 B2 | 5/2007 | Baar et al |
| 7,479,970 B2 * | 1/2009 | Christman et al. ............ 345/660 |
| 7,688,227 B1 * | 3/2010 | Tosun et al. ................ 340/995.1 |
| 2002/0109680 A1 | 8/2002 | Orbanes et al. |
| 2002/0180801 A1 | 12/2002 | Doyle et al. |
| 2005/0027705 A1 * | 2/2005 | Sadri et al. ........................ 707/5 |
| 2005/0035964 A1 | 2/2005 | Heenan |
| 2005/0195154 A1 | 9/2005 | Robbins et al. |
| 2006/0020904 A1 * | 1/2006 | Aaltonen et al. .............. 715/850 |

OTHER PUBLICATIONS

Mapquest snapshot Version 2004.
Layton, How Mapquest Works, Mapquest version 2005, 1-12.

* cited by examiner

*Primary Examiner* — Joni Richer
(74) *Attorney, Agent, or Firm* — Kilpatrick Townsend & Stockton LLP

(57) ABSTRACT

A system and method for defining the zoom response, or behavior, of a display object independently of other display objects performs a selective zoom response to a zoom level. Selective zoom response provides each display object individual zoom response logic to determine the manner of display at given zoom levels. Accordingly, display object behavior is definable on a per object basis. The zoom function triggers particular operations at a given zoom level for modifying attributes of a display object that affect the visual appearance, thus modifying the zoom behavior of the display object. Since each display object has a different zoom response logic, different display objects respond independently to a particular zoom level as appropriate for the display object. Therefore, the zoom response is object specific since each display object has its own set of attributes and zoom logic affecting those attributes.

18 Claims, 6 Drawing Sheets

SELECTIVE ZOOM RESPONSE BEHAVIOR IN COMPUTING SYSTEMS

PRIORITY CLAIM

This application is a continuation of U.S. patent application Ser. No. 11/204,760, naming inventors Yohko A. F. Kelley, Benjamin P. Bauermeister, and Michael S. De Laurentis, filed Aug. 16, 2005, and titled, "System and Methods for Selective Zoom Response Behavior," which is incorporated by reference herein in its entirety.

BACKGROUND

Graphical User Interfaces (GUI)s are a common manner of exchanging information between a user and a computer in a modern information processing environment. The graphical user interfaces typically follow a well known window-based structure. The window-based structure allows a screen display to present one or more rectangular windows, each having a particular context. An active window from among the available displayed window corresponds to an application that the user is currently exchanging information with. The windows are navigated via a pointing device, such as a mouse, touchpad or trackball, to select, activate, and provide input to the application corresponding to the window, and the keyboard is often employed for free form textual and/or numeric input.

The windows display and receive control and data information through objects or icons displayed in the window. The underlying application arranges the objects as appropriate for displaying and receiving information. The display objects include control objects, which receive input from the user, and passive objects, that present information but do not expect interactive responses. The typical conventional GUI window presents multiple simultaneous display objects, driven by the underlying application. Often, a user will manipulate the objects with the pointing device or keyboard for selecting and changing the appearance of the windows to facilitate data entry or to more readily obtain or receive information from the application. In this manner, GUIs provide an effective interactive communication medium between a user and the computer driven application.

SUMMARY

In a conventional graphical user interface (GUI), users navigate around a set of windows on a display screen. Typically, each of the windows has a zoom function available to enlarge or minimize the display region, thus providing more or less detail to the zoomed area and the display objects therein. Configurations of the invention are based, in part, on the observation that conventional zoom functions treat all display objects of a particular type in the same manner for a given zoom level. In many instances, such a zoom function scales the window area in a graphical manner to enlarge or reduce display objects, and accordingly, adjusting the area over which the zoom applies. In other arrangements, certain display objects may disappear entirely, or may become visible, only at particular zoom levels. For example, many online renderings of geographical maps may enable or disable display of various street, town, and location names depending on the zoom level.

Unfortunately, conventional methods of performing a zoom function ("zooming") in a conventional display suffer from several shortcomings. Conventional configurations treat display objects of a similar type in the same manner, thus the display objects all respond to a zoom function with similar behavior. Therefore, when a map is zoomed, for example, all text of a certain display object type is generally enlarged, reduced, or removed. There is no defined logic or manner of visual representation of a group of disparate types of screen content (e.g. display objects) when a user zooms in or out. Such exemplary cartographic zoom mechanisms, while they may allow for the enablement, disablement, and magnification of existing items, do not provide for object specific treatment by selective code execution based on the zoom level.

In contrast, configurations of the invention substantially overcome the above described shortcomings by providing a system and method for defining the zoom response, or behavior, of a display object independently of other display objects to perform a selective zoom response to a predetermined zoom level. The claimed selective zoom response allows for application code to be executed at specific zoom levels that may be dormant at other zoom levels. This allows the construction of the user interface itself, not just the content, of a display object to be modified based on the user's selected magnification (i.e. zoom level). This method may be employed to cause wholesale reappointment of both the content displayed as well as the display of the controls provided to the user to enact on that content. By allowing each type of content an individual zoom response logic to determine the manner of display at given zoom levels, the user is provided a more user-friendly experience even if several different types of content are displayed in the same screen and/or window. The selective zoom logic may define different rendering options at different zoom thresholds, for example. The zoom function may trigger, or invoke, particular operations at a given zoom level for modifying attributes of a display object that affect the visual appearance, thus modifying the zoom behavior of the display object. Since each display object has a different zoom response logic (zoom logic), the display objects may respond differently to a particular zoom level as appropriate for that display object.

In this manner, configurations of the invention provide a mechanism for defining how each display object responds at a particular zoom level. This selective response may include text, images, control structures, and the UI wrapper, or any visual item within the boundary of the display object. Further, such zoom response logic may define other behavior as well, such as pointer sensitivity, so-called "snaps," drag-and-drop behavior, and other suitable attributes. For example, zooming in on a pen sketch may increase the sketch proportionally, including the stroke size, but zooming in on a screen Post-it® note may show additional text rather than simply linearly scaling the image. Accordingly, display object behavior is definable on a per object basis. Further, the zoom level may further include discrete demarcations, or view contexts, which define threshold zoom levels triggering additional operations, such as when the zoom level transitions to a new range. The zoom response logic may be initialized to initial default values based on the display object type, but remain individually modifiable.

In particular configurations, the object specific selective zoom response is employed in a software graphical user interface (GUI) to enhance the user experience by supplementing the user context with zoom response more appropriate and tailored to each zoomed object. In other words, the same zoom response may not be appropriate for all objects and contexts. Accordingly, not all zoomed objects need respond in the conventional linear scaled manner. Configurations herein may provide, for example, that text be displayed at particular sizes, or abridged or augmented as appropriate. For example, the zoom logic may specify minimum and maximum values for text, beyond which additional or truncated text is shown. Display objects may be responsive to different zoom levels, or zoom distances, based on variables other than the zoom distance. Such variables may include the screen location, the object type, previous user functions, and other aspects of the user context. In a particular configuration, such selective zoom response is applicable to GUI control icons, or so-called "widgets", which developers embed in an application interface, such as buttons, sliders, text boxes, etc. Features of configurations disclosed herein, therefore, allow for the zoom level response and additional control (selective zoom response) to reside within (or specific to) the widget itself, rather than to the collection of widgets in a given screen area. An exemplary arrangement of selective object zoom response based on object specific rules is employed in collaboration software marketed commercially from Adobe® Systems Incorporated, of San Jose, Calif., assignee of the present invention.

In further detail, a method is disclosed for displaying graphical user interface (GUI) screen objects by determining a zoom level of a visual display having display objects, and computing one or more operations corresponding to the determined zoom level, such that the operations are selectively responsive to a predetermined zoom level for affecting behavior of the display object. A zoom processor then applies, based on the zoom level, the identified operations to a display object, in which the identified operations are independent of the operations applied to other display objects. Each of the display objects has a set of attributes that are modifiable by the operations for affecting the behavior of the object. Thus, the operations modify attributes of the display object as a result of applying the computed operations, in which the attributes correspond to, and affect the behavior of, the display object.

Each of the operations affects a particular display object because the display objects maintain an association between the zoom level and the corresponding operation, such that each the operations responsive at a particular zoom level for applying the computed operation as defined by zoom logic. The zoom level corresponds to a view context, the view context indicative of a range of the zoom level. The zoom processor computes, for a particular zoom level, the view context based on the magnitude of the zoom level.

In the exemplary configuration, each of the display objects has a display type, such that the display type determines a set of attributes having default values for the display object. The default values are responsive to the operations, and each display object maintains an independent set of attributes.

Accordingly, each of the display objects exhibits a predetermined zoom response behavior different from (i.e. defined independently in the zoom logic) the zoom response behavior of other display objects, such that the zoom response behavior is computed individually for each of the display objects. In the exemplary arrangement, determining the zoom level includes identifying a change in the current zoom level, computing a new view context based on the zoom level, and invoking display operations corresponding to the new view context, in which the display operations affecting the behavior of the display objects. Identifying a change in the zoom level typically includes receiving a user input indicative of a desired zoom level, such as from a pointing device. Applying, or invoking, the operations therefore selectively modifies the behavior of the display object in response to a predetermined zoom level.

Alternate configurations of the invention include a multi-programming or multiprocessing computerized device such as a workstation, handheld or laptop computer, cellphone or PDA device, or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
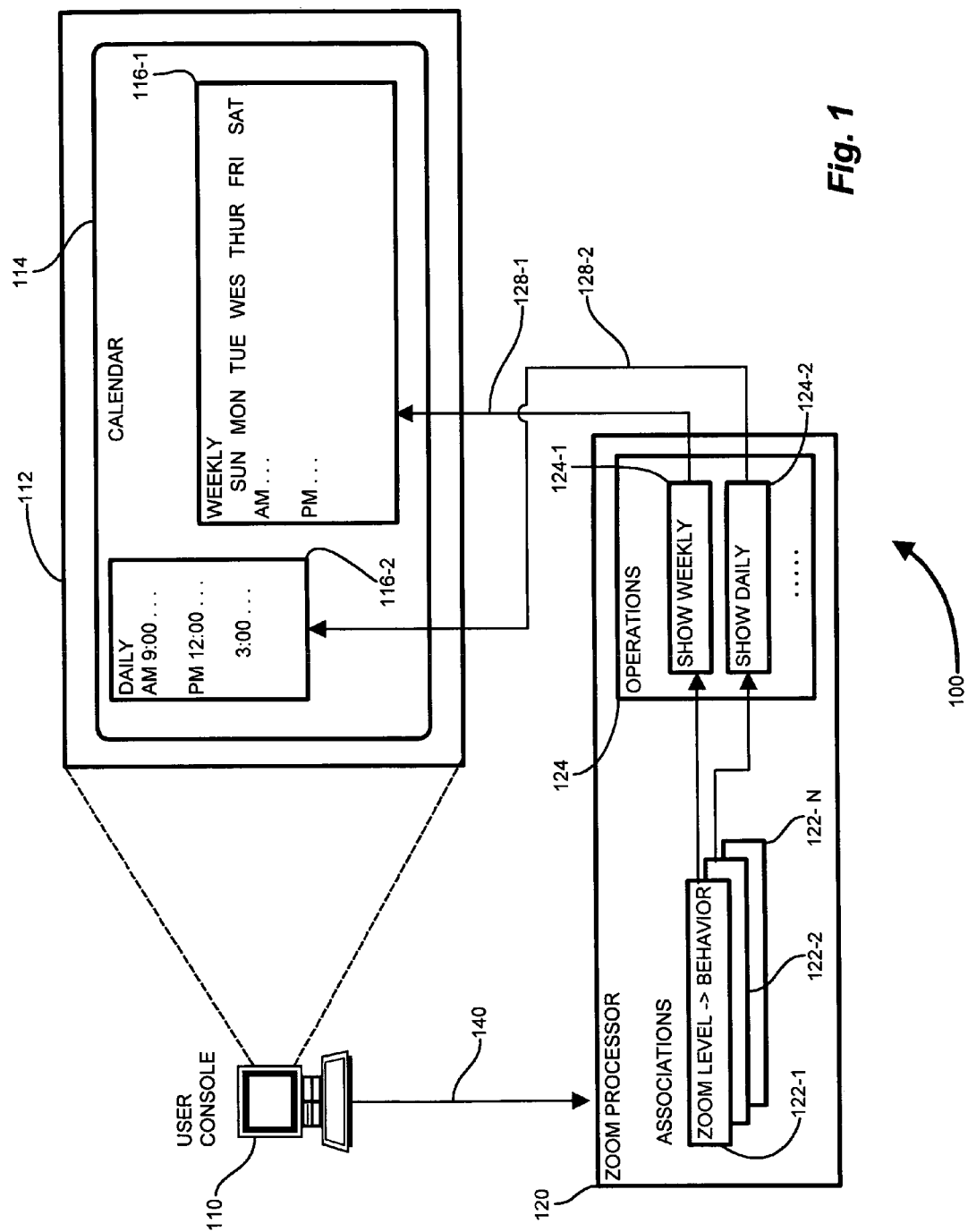
FIG. 1 is a context diagram of an exemplary graphical user interface environment suitable for use with configurations discussed herein.

Configurations discussed further below provide a system and method for defining the zoom response, or behavior, of a display object independently of other display objects to perform a selective zoom response to a predetermined zoom level. By allowing each type of content an individual zoom response logic to determine the manner of display at given zoom levels, the user is provided a more user-friendly experience even if several different types of content are displayed in the same screen and/or window. The selective zoom logic may define different rendering options at different zoom thresholds, for example. The zoom function may trigger, or invoke, particular operations at a given zoom level for modifying attributes of a display object that affect the visual appearance, thus modifying the zoom behavior of the display object. Since each display object has a different zoom response logic (zoom logic), different display objects may respond differently to a particular zoom level as appropriate for the display object. Further, the zoom logic may even be object specific for display objects of the same display object type, since each display object has its own set of attributes and zoom logic affecting those attributes.

Configurations herein allow a user or developer to define selective zoom logic to independently determine the manner in which a display object responds at a particular zoom level. This selective response may include operations affecting text, images, control structures, and the UI wrapper, or any visual item within the boundary of the display object. Further, such zoom response logic may define other behavior as well, such as pointer sensitivity, so-called "snaps," drag-and-drop behavior, and other suitable attributes. Accordingly, display object behavior is definable on a per object basis. Further, the zoom level may further include discrete demarcations, or view contexts, which define threshold zoom levels triggering the operations, such as when the zoom level transitions to a new range. The zoom response logic is typically initialized to initial default values based on the display object type, but remain individually modifiable.

An exemplary configuration discussed herein, therefore, provides a GUI display mechanism for associating a zoom level with a particular type of display behavior and/or display object layout initiated when the zoom level of the display object crosses a threshold from an adjacent zoom level range. In other words, both the appearance and relative arrangement of display object may be responsive to the zoom level. A zoom response processor associates a particular behavior with each display object. The behavior is triggered when the zoom level crosses the threshold from a previous zoom level. Since each display object has it's own set of zoom response parameters, the zoom response may be different for each display object. The zoom behavior is performed by an operation corresponding to the zoom threshold, typically a range of the zoom level which the zoom processor invokes when the zoom level crosses into the threshold. In the exemplary arrangement, the zoom levels are organized into view contexts corresponding to predetermined ranges of zoom levels. Therefore, the view contexts correspond to operations to be triggered, or invoked, when the zoom level crosses a threshold corresponding to the view context. The operations manipulate attributes of the display object to bring about the desired behavior in response to the zoom level. Since each object type has a particular set of attributes, and since the zoom response thresholds (i.e. view context) are independently maintained for each display object, each display object exhibits an object specific response to a particular zoom level. The zoom level and additional control based on the zoom level reside with the display object itself, rather than with the entire display area or window.

FIG. 1 is a context diagram of an exemplary graphical user interface environment suitable for use with configurations discussed herein. Referring to FIG. 1, in a graphical user interface environment 100, a user console 110 such as a user PC, laptop, or other interactive display has an application 112 employing one or more display windows 114. The application window 114 includes one or more display objects 116-1, 116-2 (116 generally) for representing information-conveying entities (i.e. icons) which are the subject of the application 112. In the exemplary arrangement shown, the application 112 is a calendar application and the display objects 116-1, 116-1 are schedules, discussed further below.

The user console 110 is coupled to a zoom processor 120, which is typically part of a larger processing device such as PC or laptop (not specifically shown) on which the user executes the application 112. The zoom processor 120 maintains associations 122-1 . . . 122-N (122 generally) between zoom levels and behavior of the display object. The associations 122 correspond to operations 124 that manipulate the behavior of the display objects 116. Typically, each display object 116 has a corresponding set of associations 122 for triggering various operations 124-1 . . . 124-2 (124 generally) at independent zoom level thresholds. Further, each display object 116 may have its own set of operations 124, allowing behavior that is specific to that object 116-N when the associations 122 trigger an operation 124.

In the course of performing (i.e., executing) the application 112, a user issues a zoom level input 140 via any suitable means, such as a mouse, touchpad, trackball, or other pointing device. The zoom level input 140 represents a magnitude of the zoom applied to the application window 114, and hence to display objects 116 within the window. While conventional zoom functions apply similar zoom processing to some or all objects 116 in the window 114, such as linear scaling, configurations discussed herein apply a predetermined operation 124 based on the zoom specific association 122. Accordingly, the zoom processor 120 identifies associations 122 triggered by, or corresponding to, the zoom level specified by the zoom level input 140. The triggered association 122 is indicative of a particular behavior of a corresponding display object 116. The association 122 maps the behavior to a particular operation 124 for bringing about the specified object specific behavior.

The zoom processor 120 then executes the mapped operations 124 to cause the behavioral change to the display object 116 in question, as shown by arrows 128-1 and 128-1. In the example shown, the display objects 116 are schedules for displaying a calendar. The zoom level input 140 triggers an association for a weekly display 116-1 and a daily display 116-2, respectively. Therefore, the zoom level displays a weekly calendar at a particular zoom level, and displays a daily calendar at a lower zoom level (i.e. as the user zooms in, the display shows the more granular daily calendar). Accordingly the triggered (invoked) operation display daily 124-2 causes a daily display for object 116-2, while the display weekly operation 124-1 causes the weekly display 116-1. In the exemplary configuration, the claimed selective zoom response is performed by invoking application code to be executed at specific zoom levels that may be dormant at other zoom levels. This allows the construction of the user interface itself, not just the content, of a display object to be modified based on the user's selected magnification (i.e. zoom level). This approach may therefore be employed to cause wholesale reappointment of both the content displayed as well as the display of the controls provided to the user to enact on that content. Alternate arrangements may provide other mechanisms for selective zoom response embedded in or associated with the display object itself, rather than with the entire window or screen area.

Figure 2:
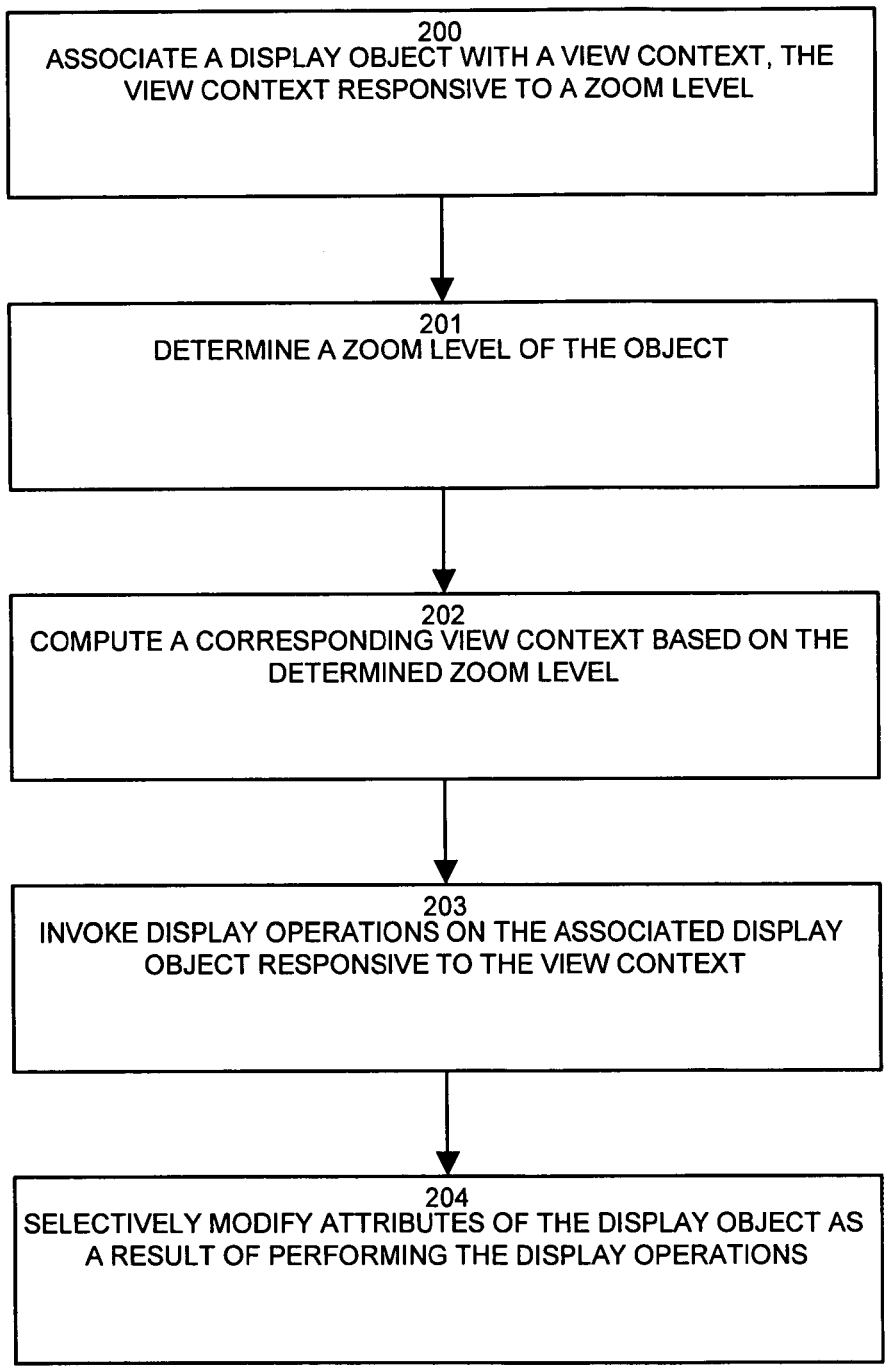
FIG. 2 is a flowchart of zoom responsive display object behavior in the environment of FIG. 1.

FIG. 2 is a flowchart of zoom responsive display object 116 behavior in the environment of FIG. 1. Referring to FIGS. 1 and 2, at step 200, the method for displaying graphical user interface (GUI) screen objects as defined herein includes associating a display object 116 with a view context, in which the view context is responsive to a zoom level, and determining the zoom level of the object, as depicted at step 201. The zoom level is typically received from a user input device, such as a mouse, trackball, keyboard, or other pointing device. The zoom level is often represented as a gradual continuum of increasing size range (zoom in) or decreasing size and increasing scope (zoom out). However, it is one feature of the claimed configuration to provide other than simply uniform size scaling in response to the zoom level. Each display object 116 has a plurality of view contexts determined by the zoom level. Typically, the view context represents discrete ranges along a continuum defined by the zoom level, i.e., one view context covers 0-30%, another from 31-70%, and a third from 71-100%, for example. The zoom processor 120 computes a corresponding view context based on the determined zoom level, as depicted at step 202 and identifies, via the associations 122, behavior of a particular display object 116 at the determined zoom level.

The zoom processor 120, at step 203, invokes display operations 124 on the associated display object 116 responsive to the view context based on the associations 122. The invoked operations 124 selectively modify attributes of the display object 116 as a result of performing the display operations 124, thus effecting the desired object 116 behavior, as disclosed at step 204. The display operations may, for example, cause a daily 124-1 or weekly 124-2 display of a calendar object 116-1, 116-2, respectively. Further, the same zoom level may generate different operations for the display objects 116. For example, one calendar 116-1 may display a daily view at a 31% zoom, while another calendar changes (zooms) from a weekly to a daily view at a 71% zoom level.

Figure 3:
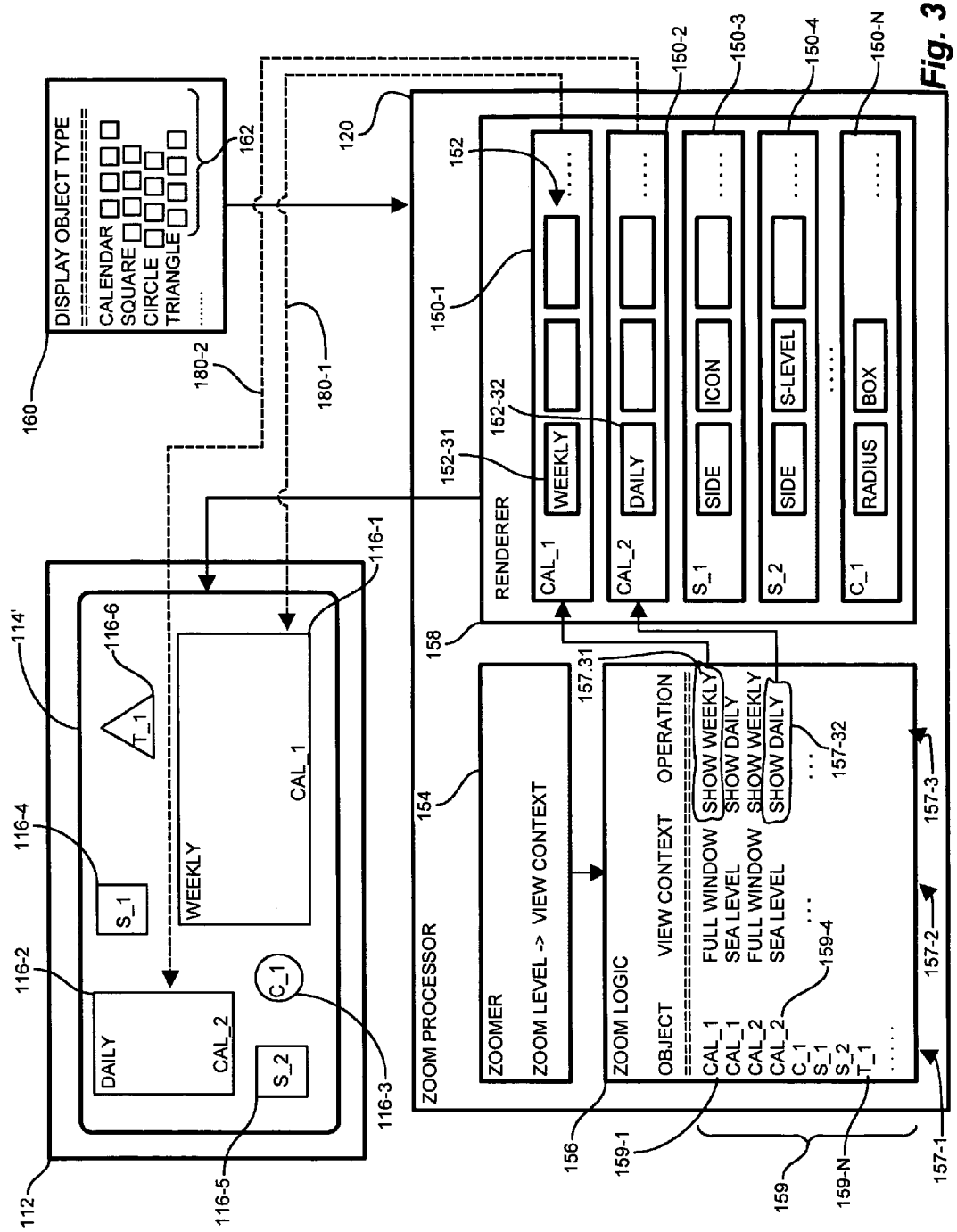
FIG. 3 is a block diagram of a graphical user interface suitable for use with zoom processing as described herein.

FIG. 3 is a block diagram of a graphical user interface suitable for use with zoom processing as described herein. Referring to FIGS. 1-3, an exemplary arrangement of the zoom processor 120 is shown. Alternate arrangements of a zoom processor 120 for associating independent selective zoom response with individual display objects 116 as claimed herein will be apparent to those skilled in the art. In the exemplary configuration in FIG. 3, another exemplary display screen 114' driven from the application 112 is shown. The display 114' includes additional display objects including circle 1 116-3, square 1 and 2 116-4, 116-5, and triangle 116-6. Each of the display objects 116 has a display object type 160. The display object type 160 determines attributes 162 (discussed further below) of the display object 116 and sets reasonable defaults that are subsequently modifiable by the methods discussed herein. For example, the calendar display object type has attributes for daily or weekly display, a circle has a radius attribute, etc.

The zoom processor 120 illustrates a particular implementation of the associations and triggered operations, and includes a zoomer 154, zoom logic 156, and a renderer 158. The zoomer 154 computes a view context from a zoom level specified by a user input 140, typically a numerical percentage or a so-called "dragged" rectangular outline from a mouse. The view context is a discrete characterization of the appearance of the display object, such as iconic, fit in window, or "sea level" (i.e. normal), discussed further below. The zoom logic 156 identifies, for each display object 116, the various view contexts applicable to that display object 116 and the corresponding operation to invoke at that view context. The zoom logic 156 may take the form of a table lookup, as illustrated, or may involve other programmed logic. In the exemplified zoom logic, each entry 159-N lists a display object 157-1, a view context 157-2, and the operation to invoke 157-3 to bring about the desired screen result for displaying the object 116 according to the appropriate zoom response.

The renderer 158 has an entry 150-1 . . . 150-N (150 generally) for maintaining a set of attributes 152-1 . . . 152-N (152 generally) for each display object 116. The attributes 152 specify the rendered, or currently displayed, form of the display object at the current zoom level. The operations 157-3, therefore, manipulate the attributes 152 to result in the proper rendering, such as weekly or daily display. Each of the display objects 116 has a corresponding entry 150 including an independent set of attributes 152. As indicated above, the display object type 160 enumerates (lists) the attributes 152 for each object type, and also sets initial default values 162, which may be, for example, sea level. Subsequent user zoom inputs 140 direct the zoom processor 120 to modify the attributes for the desired zoom response, also discussed in further detail below. For example, at a particular zoom level, the zoom logic entry 159-1 for calendar display object CAL_1 116-1, the view context "full window" triggers the "show weekly" 157-31 operation to modify the attribute "weekly" to display a weekly calendar. Another entry 159-4 specifies a sea level view context to trigger a "show daily" 157-32 operation for listing a daily calendar. Display object CAL_2 116-2, therefore, maintains separate zoom logic which may be responsive at different or similar zoom levels, and may invoke similar or different operations 157-3.

Figure 4:
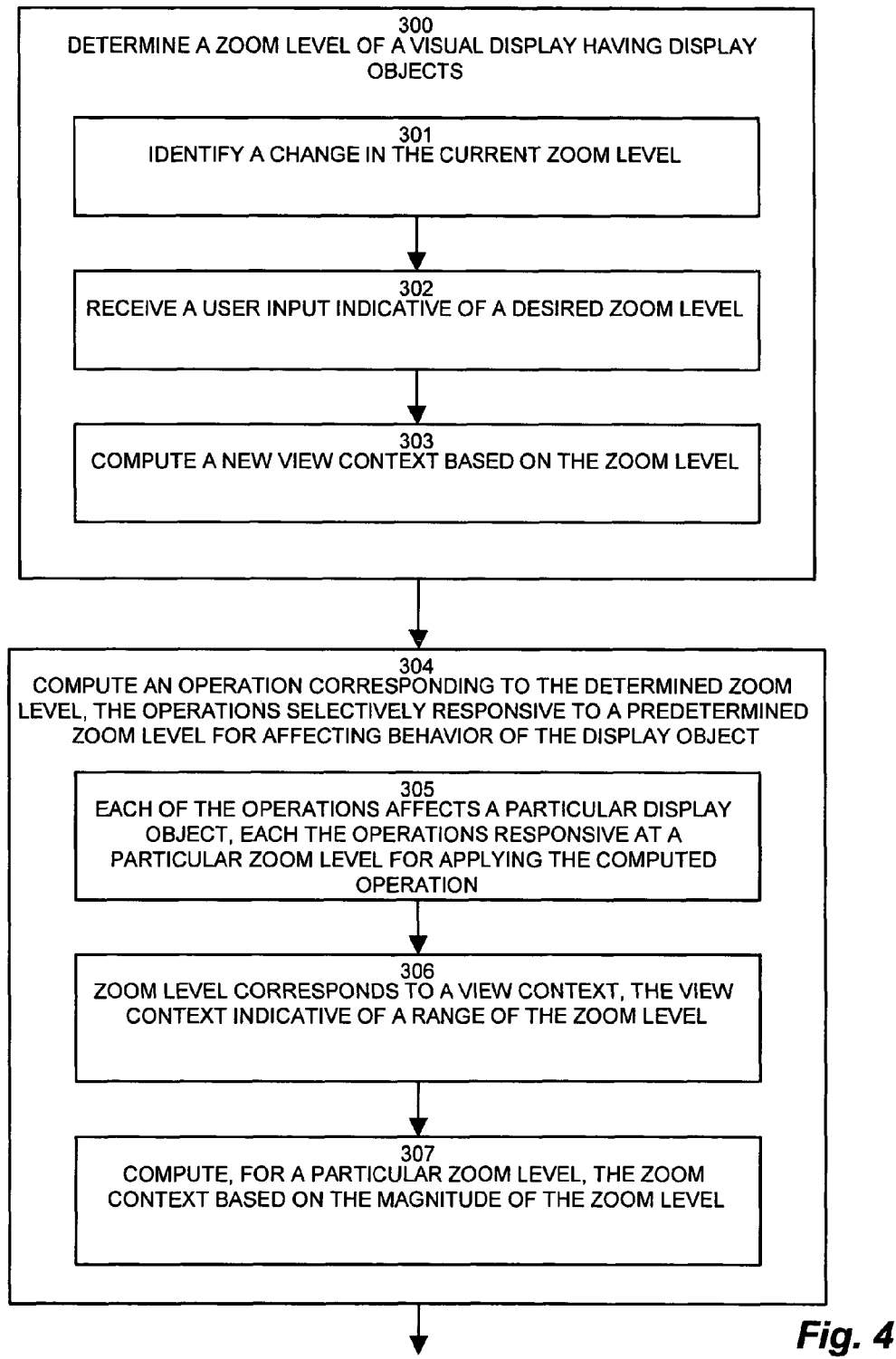
FIGS. 4-6 are a flowchart of zoom processing in the exemplary GUI of FIG. 3.
Figure 5:
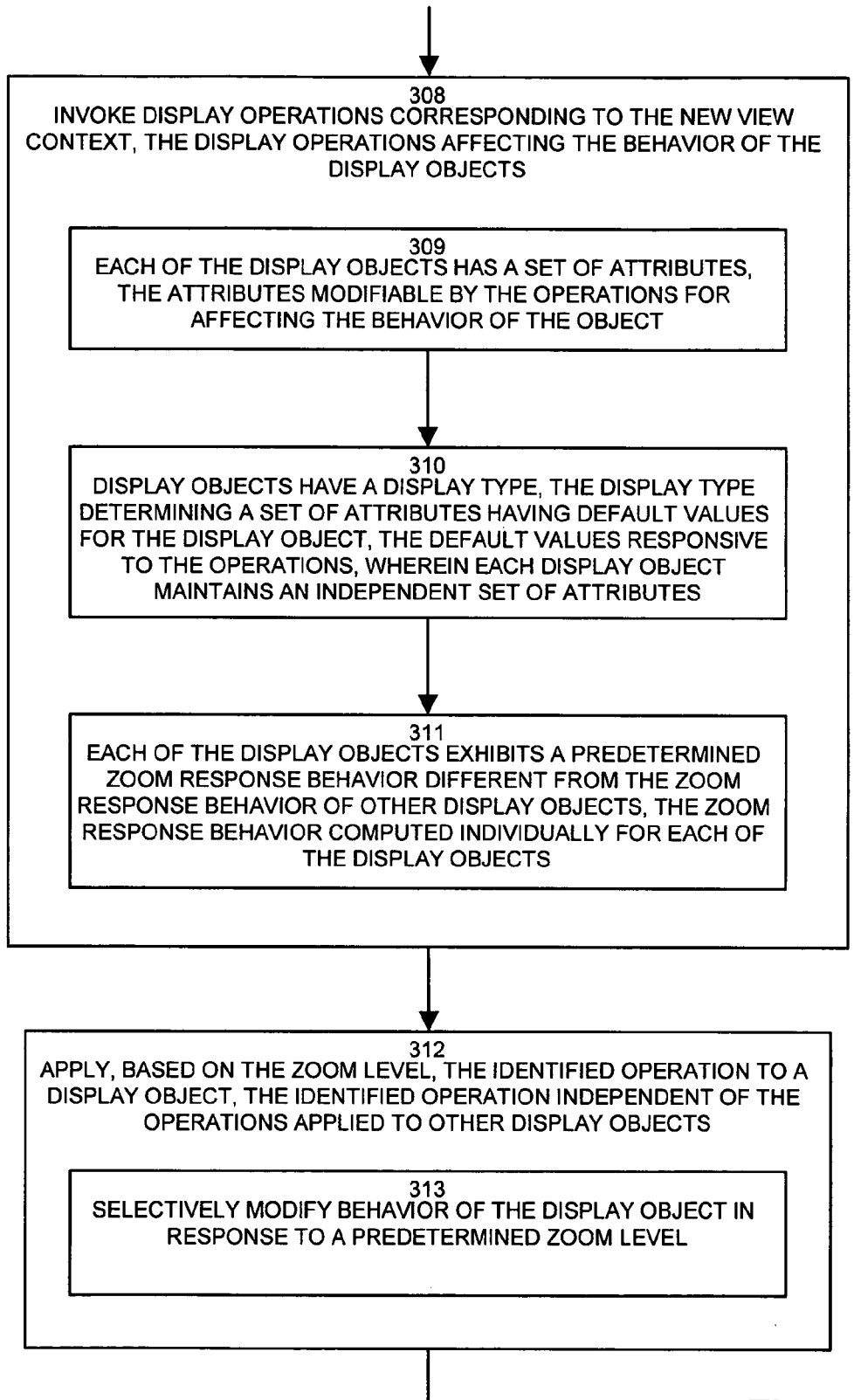
Figure 6:
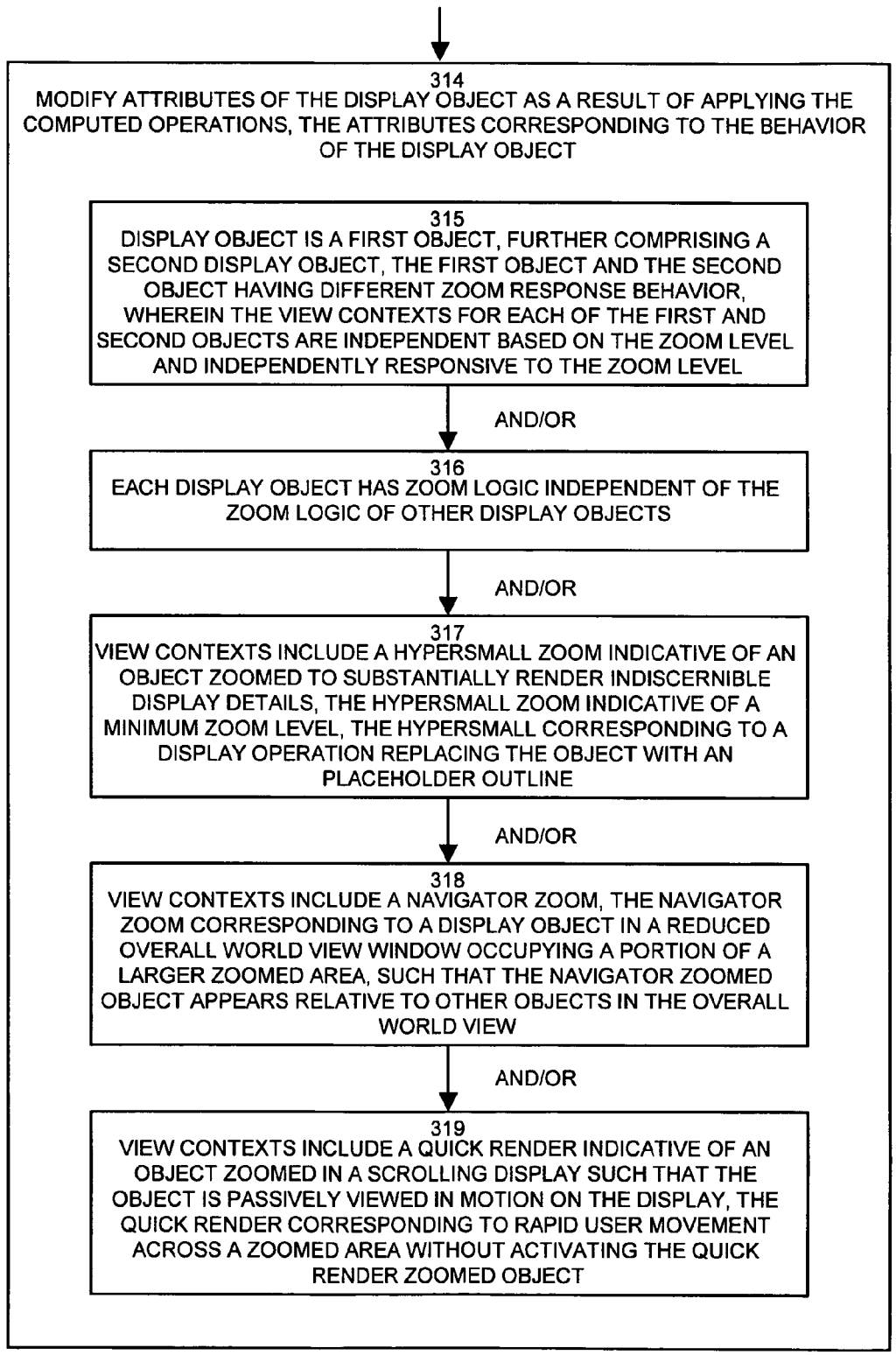

FIGS. 4-6 are a flowchart of zoom processing in the exemplary GUI of FIG. 3. Referring to FIGS. 1 and 3-6, at step 300, the zoomer 154 in the zoom processor 120 determines a zoom level of the visual display 114' having display objects 116, as depicted at step 300. The zoom processor 120 identifies a change in the current zoom level, as shown at step 301. Typically, identifying a change in the zoom level further includes receiving a user input 140 indicative of a desired zoom level, as depicted at step 302, such as when the user is navigating the screen and selects an object 116 to zoom in or out on. At step 303, the zoomer 154 computes the new view context based on the zoom level received from the user. The view context identifies a particular user context or setting, and may include other factors in addition to the zoom level, such as the manner in which the user is navigating the screen and whether the user is actively invoking the display object or passively viewing.

Exemplary view contexts include the following: a hypersmall view context indicates that the user has zoomed substantially out so as to render the display object 116 mostly indiscernible such as a dot. In such a context, the object may be shown as a gray box, in a so-called "reaping" function, or simply as an outline, depending on the displayed size. An iconic view context indicates that the display is small, but still discernable in roughly the size of a standard icon in the current operating system (e.g. a 64*64 pixel shape in Windows®). An iconic toolbar is similar, and lists a series of display objects 116 with the expectation of further instantiating one or more of them. A sea level view context indicates a normal size exhibiting sufficient detail to fulfill the display object's purpose, and may typically be employed as a default. A fit-in-window view context sizes the display object 116 to the limits of the current window, or, optionally, the entire screen. An oversize view context expands the object to larger than the window and is typically employed to drill down into the display object, thus representing a substantial zoom level (>100%, for example).

Further, users may often navigate around a work area substantially larger than the screen. The screen is often scrolled as a window over the work area in such instances. A navigator pod view context includes a small window snapshot of the entire navigable area, and displays the objects within the snapshot accordingly. A quick render view context indicates that a user is passing over a display object, such as scrolling. In this context, the display object is not invoked by the user, so a fast efficient passive display is appropriate. For example, a user may be navigating from far left to far right in a rapid scrolling manner, or may exhibit a so-called "hulk hop," characterized by traversing over a large portion of the overall work area (as if one was "jumping" out of the page and landing back down).

In the exemplary configuration, the zoomer 154 computes or identifies the view context from the zoom level. This may simply be a subrange mapping from the zoom level (i.e. "splits up" the zoom level range) or may take other forms. The zoom processor 120 then computes an operation 124 corresponding to the determined zoom level, in which the operations 124 are selectively responsive to a predetermined zoom level for affecting behavior of the display object 116, as shown at step 304. As indicated above, based on the resulting view context 157-2, the zoom logic 156 is invoked to identify an operation 157-3 for each display object. As shown at step 305, each of the operations 157-3 affects a particular display object 116, such that each of the operations 124 are responsive at a particular zoom level for applying the computed operation 124, corresponding to each entry 159 in the zoom logic 156. Based on input from the zoomer 154, each zoom level corresponds to a view context, in which the view context is indicative of a range of the zoom level input by the user, as depicted at step 306. Therefore, computing the resulting operation 124 includes invoking the zoomer to compute, for a particular zoom level 140, the view context based on the magnitude of the zoom level, as shown at step 307.

At step 308, the zoom processor 120 invokes the display operations 157-3 corresponding to the new view context, in which the display operations 124 affect the behavior of the display objects 116. Each of the display objects 116 has a set 1 . . . 150-N (150 generally) of attributes 152, such that the attributes 152 are modifiable by the operations 157-3 for affecting the behavior of the object 116, as depicted at step 309. The attributes 152 are defined by the display type 160 of the object 116, in which each of the display objects has a display type 160, such that the display type determines the set of attributes 150 having default values 162 for the display object 116, the default values being responsive to the operations, and each display object 116 maintains an independent set 150 of attributes 152, as disclosed at step 310. The renderer 158 maintains and modifies the attribute sets 150-N for each display object 116. For example, continuing the example above, the entry 159-1 triggers a show weekly operation 157-31 to set the weekly attribute 152-31 in the corresponding attribute set 150-1 for calendar 1 (CAL_1) 116-1. Similarly, the operation show daily 157-32, for display object 116-2, sets the daily attribute 152-32 in the attribute set 150-2 for calendar 2 (CAL_2) 116-2, and applied to the display objects 116-1, 116-2 as shown by dotted lines 180-1 and 180-2 respectively. Since the zoom logic maintains entries 152 for each object and view context, each of the display objects 116 is operable to exhibit a predetermined zoom response behavior different from the zoom response behavior of other display objects 116, such that the zoom response behavior is computed individually for each of the display objects 116, as disclosed at step 311.

At step 312, the renderer 158 applies, based on the zoom level, the identified operation 124 to the display object 116, such that the identified operation 124 is independent of the operations applied to other display objects 116, as shown by dotted lines 180-1, 180-2. Therefore, applying the operations 157-3 further includes selectively modifying the behavior of the display object 116 in response to a predetermined zoom level, as depicted at step 313. The zoom logic 156 codifies the predetermined zoom level and enumerates the corresponding operation 157-3 for resulting in the desired behavior.

The renderer 158 maintains the attributes 152 modified by the operations for resulting in the desired zoom response behavior. Accordingly, at step 314, the renderer modifies the attributes 152 of the display object 16 as a result of applying the computed operation 157-3, in which the attributes 152 correspond to the behavior of the display object. In the exemplary configuration, the display object 116-1 is a first object, further comprising a second display object 116-2, the first object and the second object having different zoom response behavior, such that the view contexts 157-2 for each of the first and second objects 116-1, 116-2 are independent based on the zoom level and independently responsive to the zoom level, as depicted at step 315. Each display object 116 has zoom logic independent of the zoom logic of other display objects 116, as depicted at step 316, because each object 116 has independent entries 159 in the zoom logic 156. As indicated above, the view contexts 157-2 applicable to the attributes modified by the renderer 158 include a hypersmall zoom indicative of an object zoomed to substantially render indiscernible display details, the hypersmall zoom indicative of a minimum zoom level, and corresponding to a display operation replacing the object with an placeholder outline, as shown at step 317. Further, the view contexts 157-2 include a navigator zoom, in which the navigator zoom corresponds to a display object in a reduced overall world view window occupying a portion of a larger zoomed area, such that the navigator zoomed object appears relative to other objects in the overall world view, as depicted at step 318. The view contexts 157-2 further include a quick render indicative of an object zoomed in a scrolling display such that the object is passively viewed in motion on the display, in which the quick render view context corresponds to rapid user movement across a zoomed area without activating the quick render zoomed object, as depicted at step 319. Other view contexts as described above are available and will be apparent to those of skill in the art.

Those skilled in the art should readily appreciate that the programs and methods for zoom processing as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for zoom processing has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed:
1. A computer-implemented method, comprising:
   determining, by a processor, a zoom level of a visual display rendering a first display object and a second display object;
   determining that the zoom level is within a first range associated with zooming the first display object and within a second range associated with zooming the sec- ond display object, wherein the first range and the second range have different values;

determining a first set of non-geographical information to render in the first display object, wherein the first set of non-geographical information is selectively determined based at least in part on the zoom level being within the first range and based at least in part on a type of the first display object, wherein the determining comprises determining a first view context based on the zoom level and identifying a first operation corresponding to the first view context, wherein the first operation comprises updating an attribute of the first display object;

determining a second set of non-geographical information to render in the second display object, wherein the second set of non-geographical information is selectively determined based at least in part on the zoom level being within the second range and based at least in part on a type of the second display object, wherein the determining comprises determining a second view context based on the zoom level and identifying a second operation corresponding to the second view context, wherein the second operation comprises updating an attribute of the second display object;

rendering the first set of non-geographical information in the first object; and rendering the second set of non-geographical information in the second object.

2. The method of claim 1, wherein the first display object has a set of attributes and rendering the first set of information in the first object comprises modifying one of the attributes.

3. The method of claim 1, wherein program logic associated with each display object defines a plurality of sets of non-geographical information, each set corresponding to a different zoom level range.

4. The method of claim 3, wherein the program logic associated with the second display object is separate from the program logic associated with the first display object.

5. The method of claim 1, wherein the first set of information is different from the second set of information.

6. The method of claim 1, wherein the first set of information is determined based at least in part on an identity of the first display object, and wherein the second set of information is determined based at least in part on an identity of the second display object.

7. A computer program product comprising a non-transitory computer-readable medium embodying program code executable by a computing system comprising at least one processor, the program instructions comprising:

program code that configures the processor to access data identifying a first display object and a second display object;

program code that configures the processor to determine a zoom level;

program code that configures the processor to determine that the zoom level is within a first range associated with zooming the first display object and within a second range associated with zooming the second display object, wherein the first range and the second range have different values;

program code that configures the processor to determine a first set of non-geographical information to render in the first display object, wherein the first set of non-geographical information is selectively determined based at least in part on the zoom level being within the first range and based at least in part on a type of the first display object, wherein the determine comprises determining a first view context based on the zoom level and identifying a first operation corresponding to the first view context, wherein the first operation comprises updating an attribute of the first display object;

program code that configures the processor to determine a second set of non-geographical information to render in the second display object, wherein the second set of non-geographical information is selectively determined based at least in part on the zoom level being within the second range and based at least in part on a type of the second display object, wherein the determine comprises determining a second view context based on the zoom level and identifying a second operation corresponding to the second view context, wherein the second operation comprises updating an attribute of the second display object;

program code that configures the processor to render the first set of non-geographical information in the first object; and program code that configures the processor to render the second set of non-geographical information in the second object.

8. The product of claim 7, further comprising program code that configures the processor to, in response to input changing the zoom level to a different zoom level, determine a first other set of information for the first display object and render the first other set of information in the first object.

9. The product of claim 8, further comprising:

program code that configures the processor to, in response to the input changing the zoom level, determine a second other set of information for the second display object and render the second other set of information in the second object.

10. The product of claim 9, wherein the second other set of information comprises information that is not included in the first other set of information.

11. The product of claim 9, wherein the second other set of information comprises information that is not included in the second set of information.

12. The product of claim 7, wherein the first display object has a set of attributes and rendering the first set of information in the first object comprises modifying one of the attributes.

13. The product of claim 7, wherein the program code that configures the processor to access data identifying a first display object comprises:

program code that configures the processor to access data identifying a plurality of display objects including the first display object, each of the plurality of display objects associated with logic that defines a plurality of sets of information for the object to render at different zoom levels.

14. A system, comprising:

a processor; and a memory, wherein the memory embodies program code executable by the processor and comprising:

program code that configures the processor to access data identifying a first display object and a second display object to be rendered;

program code that configures the processor to determine a zoom level;

program code that configures the processor to determine that the zoom level is within a first range associated with zooming the first display object and within a second range associated with zooming the second display object, wherein the first range and the second range have different values;

program code that configures the processor to determine a first set of non-geographical information to render in the first display object, wherein the first set of non-geographical information is selectively determined based at least in part on the zoom level being within the first range and based at least in part on a type of the first display object, wherein the determine comprises determining a first view context based on the zoom level and identifying a first operation corresponding to the first view context, wherein the first operation comprises updating an attribute of the first display object;

program code that configures the processor to determine a second set of non-geographical information to render in the second display object, wherein the second set of non-geographical information is selectively determined based at least in part on the zoom level being within the second range and based at least in part on a type of the second display object, wherein the determine comprises determining a second view context based on the zoom level and identifying a second operation corresponding to the second view context, wherein the second operation comprises updating an attribute of the second display object;

program code that configures the processor to render the first set of non-geographical information in the first object; and program code that configures the processor to render the second set of non-geographical information in the second object.

15. The system of claim 14, wherein the program code that configures the processor to determine a zoom level comprises code that causes the processor to receive an input indicative of a desired zoom level.

16. The system of claim 14, wherein the second set of information includes information that is not included in the first set of information.

17. The system of claim 14, further comprising program code that configures the processor to define a plurality of sets of information, wherein each set of information is associated with one of the first and second display objects and is associated with a different zoom level range.

18. The system of claim 17, wherein a particular first set of information associated with the first display object includes information that is not included in a particular second set of information associated with the first display object.

* * * * *